Oct. 25, 1932.   B. B. WATERMAN   1,884,937
SHANK STIFFENER AND METHOD OF MAKING THE SAME
Filed April 11, 1929   2 Sheets-Sheet 1
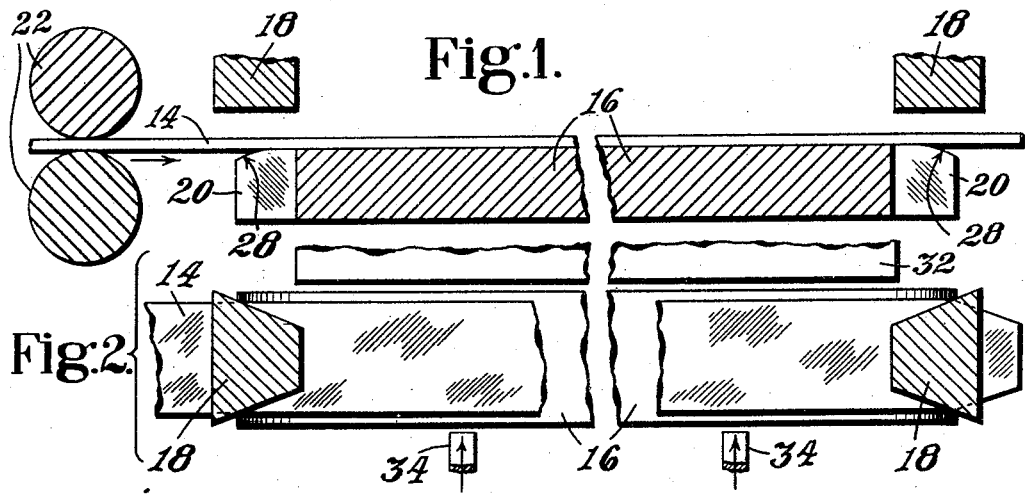
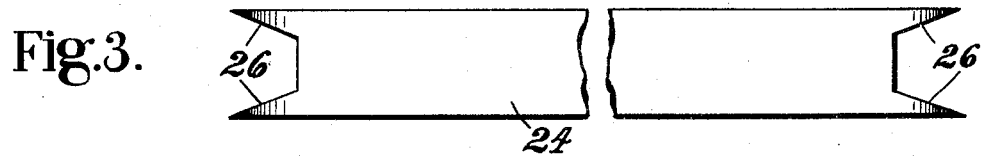
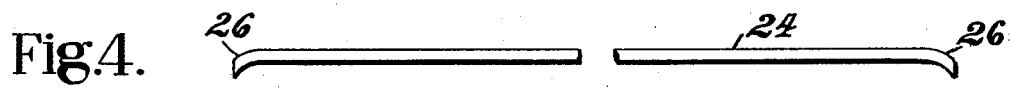
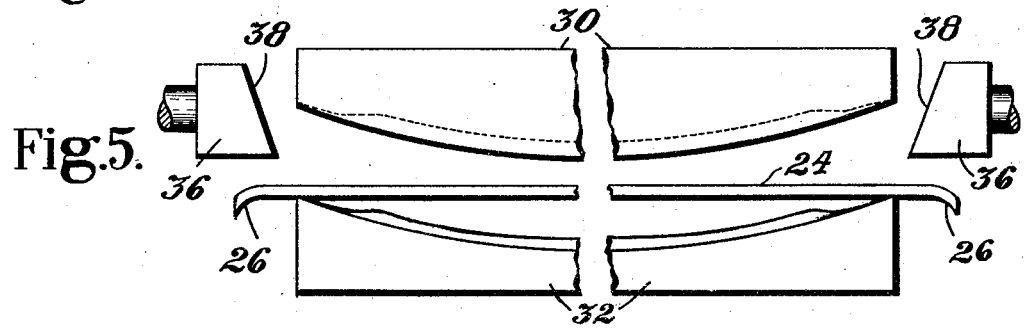
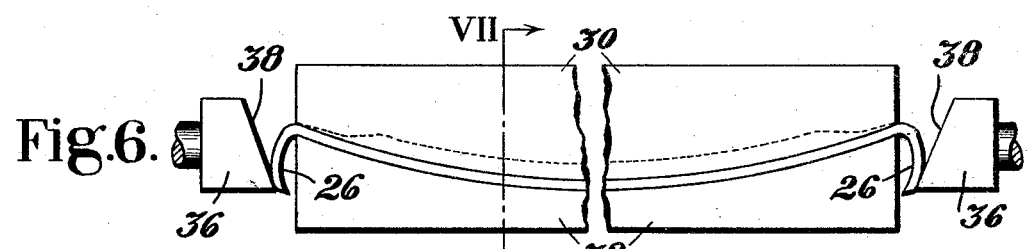
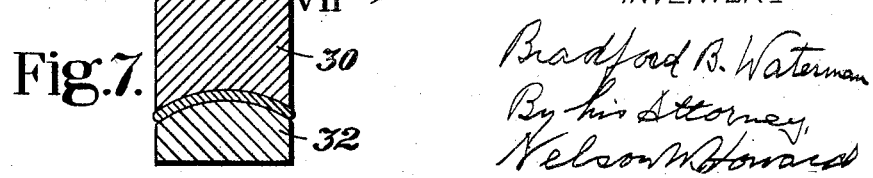
INVENTOR
Bradford B. Waterman
By his Attorney,
Nelson Howard Oct. 25, 1932. B. B. WATERMAN 1,884,937
SHANK STIFFENER AND METHOD OF MAKING THE SAME
Filed April 11, 1929  2 Sheets-Sheet 2
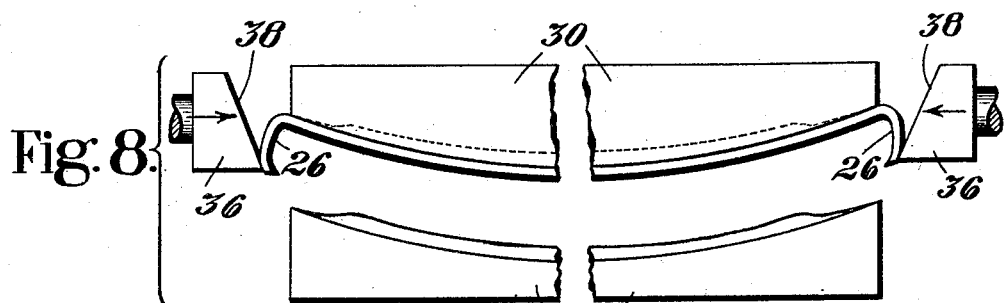
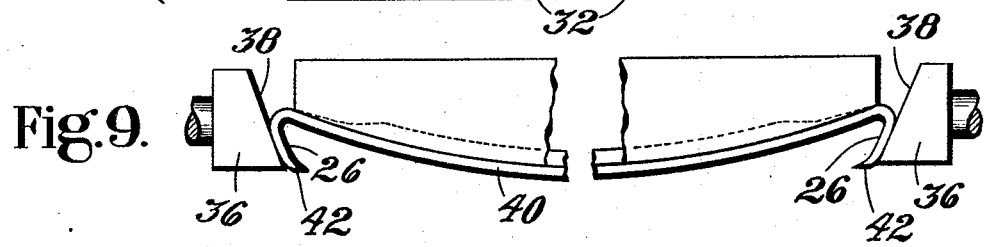
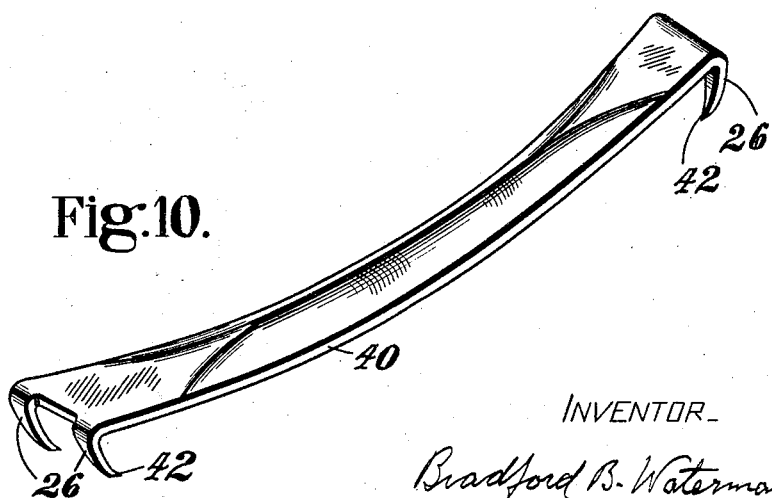
INVENTOR_
Bradford B. Waterman
By his Attorney,
Nelson M. Howard Patented Oct. 25, 1932

1,884,937

UNITED STATES PATENT OFFICE

BRADFORD B. WATERMAN, OF EAST BRIDGEWATER, MASSACHUSETTS, ASSIGNOR TO UNITED SHOE MACHINERY CORPORATION, OF PATERSON, NEW JERSEY, A CORPORATION OF NEW JERSEY

SHANK STIFFENER AND METHOD OF MAKING THE SAME

Application filed April 11, 1929. Serial No. 354,409.

This invention relates to improvements in shank stiffeners and methods of making the same. The invention is herein illustrated in its application to shank stiffeners provided with a pair of attaching prongs at each extremity thereof, although in certain aspects the invention is not necessarily limited to stiffeners of this particular type.

In the manufacture of McKay-sewed shoes it is customary to employ pronged shank stiffeners of the type above referred to and to attach the stiffeners to the insole after the insole has been tacked to the last and the upper has been lasted over, the prongs being driven through the insole into engagement with the metal bottom of the last by the blows of a hammer and being deflected by the last bottom so that they are turned over and clenched against the inner side of the insole. In order for the prongs to be most effectively clenched and the stiffeners to be firmly attached, it is desirable for the prongs at each end of the stiffener to be deflected inwardly toward the opposite end of the stiffener. In pronged stiffeners of the type referred to as heretofore constructed, however, the prongs are usually bent at right angles to the body portion of the stiffener and when the ends of the stiffener are struck with a hammer the prongs are fully as liable to be deflected outwardly as inwardly upon engaging the last bottom.

One object of the present invention is to provide a pronged shank stiffener which is so constructed as to insure that the tips of the prongs will invariably be turned or deflected inwardly as the prongs are being driven through the insole of a lasted shoe.

With this object in view, the invention provides a novel method of making shank stiffeners which consists in forming a blank of such shape as to provide a prong extending lengthwise of the blank beyond one extremity of the body portion thereof and having its tip curved out of the plane of the blank, and bending the prong in the direction toward which its tip is curved into a position to form an acute angle with the body portion of the blank. As herein illustrated a pair of attaching prongs are formed at each extremity of the body portion of the stiffener blank and each prong is bent through an angle of more than ninety degrees so that it forms an acute angle with the body portion of the stiffener, and, in addition, the tip of each prong is curved inwardly so as even more positively to insure that the prong will be turned or deflected inwardly as it is clenched against the insole by engagement with the last bottom. In accordance with the improved method illustrated in the drawings the blank is cut off from one end of a strip of stock by means of upper and lower dies which cooperate also to blank out the prongs and to curve the tip of each prong in a direction toward which the prong is subsequently to be bent. Thereafter, as herein exemplified, the stiffener blank is transferred to a position between cooperative forming dies and these dies are operated to impart the desired lengthwise and widthwise curvature to the body portion of the blank; after which wiper members are operated to complete the formation of the stiffener, the wiper members moving first downwardly past the opposite ends of the lower forming die to bend the prongs toward the ends of the die into positions substantially at right angles to the body portion of the stiffener. The illustrated wiper members are then moved upwardly to strip the stiffener from the lower die, and then inwardly toward each other to bend and set the prongs at acute angles to the body of the stiffener, the wiper members having sloping faces which determine the degree of inclination finally imparted to the prongs.

Considered in another aspect invention is also to be recognized as residing in an improved shank stiffener consisting of an elongated strip having an attaching prong projecting from one extreme end thereof, the prong sloping inwardly toward the opposite end of the strip and having its tip curved out of the plane of the rest of the prong.

The invention also resides in other novel features of construction and improvements in the art of making shank stiffeners hereinafter described and claimed.

The invention will be described with reference to the accompanying drawings, in which Fig. 1 is a view, in vertical section, of dies used in forming blanks from which the improved shank stiffeners are made, showing also a strip of stock in position to be operated upon and rolls for feeding the stock to the dies;

Fig. 2 is a view, partially in plan and partially in horizontal section, of the dies and stock shown in Fig. 1;

Figs. 3 and 4 are plan and edge views, respectively, of a stiffener blank formed by the dies shown in Figs. 1 and 2;

Fig. 5 is a side elevational view of co-operating forming dies and wipers such as may be employed for molding the stiffener blanks into shape and bending the prongs, a blank being shown in position to be acted upon;

Fig. 6 is a view similar to Fig. 5 but showing the dies and wipers in the relative positions in which they appear after a stiffener blank has been molded and the first stage in the bending of the prongs has been completed;

Fig. 7 is a section on the line VII—VII of Fig. 6;

Figs. 8 and 9 illustrate further steps in the process of making a shank stiffener;

Fig. 10 is a perspective view of a finished shank stiffener made in accordance with the present invention; and Fig. 11 is a side elevational view of a modification of the stiffener shown in Fig. 10.

In practising the method hereinbefore referred to with the aid of the apparatus shown in the drawings, a stiffener blank is first formed from a strip of stock 14 by the action of cutting dies comprising a fixed die 16 and two movable dies 18 which are normally located above the fixed die but are movable downwardly into co-operative engagement with the notched ends 20 of the fixed die 16. The strip of stock 14 is fed by feed rolls 22 over the fixed die 16 into position to be acted upon simultaneously by both movable dies 18. The dies 18 and the notched ends 20 of the die 16 are shaped as shown to cut from the strip 14 a stiffener blank 24 (Fig. 3) having at each extremity of its body portion two pointed prongs 26, the prongs being arranged one at each corner of the respective extremity or extreme end of the body portion of the blank. As shown in Fig. 1, the upper surface of the fixed die 16 is relieved at the opposite ends of the die so as to provide a downwardly curved face 28 against which the portions of the stock which are to form the prongs 26 are forced by the action of the dies 18 as the prongs are being died out, with the result that when the stiffener blank has been completely severed from the strip 14 an initial curvature is imparted to the tips of the prongs 26, the curvature being in the direction toward which the prongs are subsequently to be bent to form the completed stiffener.

The stiffener blank 24 is next molded into the form of a shank stiffener and for this purpose the blank is removed from the die 16 and placed in position to be acted upon by co-operating upper and lower forming or molding dies 30 and 32 (Fig. 5). The transfer of the blank is effected by means of push bars 34 which are arranged to engage one edge of the blank and which are movable simultaneously in the direction indicated by the arrows in Fig. 2, the dies 18 having been raised above the die 16 before the push bars 34 are operated. The blank is moved by the push bars 34 into a position upon the lower forming die 32 and beneath the upper forming die 30, as shown in Fig. 5. The dies 30 and 32 are shaped to impart to the blank 24 the longitudinal and transverse curvatures desired in the finished stiffener. The molding of the stiffener is effected by lowering the die 30 into the position shown in Fig. 6.

After the body portion of the stiffener blank has been molded into shape, the prongs 26 are bent downwardly and inwardly toward the respective ends of the lower die 32 by the action of end wipers 36 which, for this purpose, are located adjacent to the ends of the dies 30 and 32 and are movable vertically downward into the positions shown in Fig. 6. This movement of the end wipers 36 bends the prongs 26 into positions substantially at right angles to the body portion of the stiffener and close to the ends of the die 32. In order that the prongs may be bent still further inwardly into positions wherein the prongs at each end of the stiffener are inclined toward the opposite end of the stiffener and thus form acute angles with the body of the stiffener, the upper die 30 and the end wipers 36 are first raised to strip the stiffener from the lower die and raise it into the position shown in Fig. 8, and thereafter the wipers are moved horizontally inwardly to the positions shown in Fig. 9 to impart the inward slope to the prongs. The wipers 36 are enabled to strip the stiffener from the die 32 and raise it into the position shown because of the fact that the inner faces of the end wipers are beveled or inclined, as shown at 38 in the drawings, this construction insuring that, in the downward movements of the end wipers after the lower edges of the inclined inner faces thereof have passed below the curved tips of the prongs, the bending pressure exerted by the wipers upon the prongs will be relieved, and the prongs permitted to react against the bending pressure sufficiently to position them just within the path of vertical movement of the lower extremities of the wipers and thus enabling the latter to raise the stiffener when the wipers are raised. The wipers 36 are then moved inwardly until the inclined surfaces 38 engage substantially the entire outer surfaces of the prongs, thus bending the prongs into the positions shown in Fig. 9, the slope of the inner faces of the wipers 36 determining the inclination of the prongs with respect to the adjacent body portions of the stiffener and insuring that the prongs of each pair, when bent into final positions, will have their body portions disposed in the same plane. A completed shank stiffener 40 has now been produced and upon upward movements of the end wipers the stiffener is released.

In the finished shank stiffener 40, as shown in Figs. 9 and 10, the body portion of each of the prongs 26 slopes inwardly a substantial amount toward the opposite end of the strip and furthermore, the tip of each prong is curved or offset inwardly from the plane of the body portion. If desired, however, the curvature at the tips of the prongs may be dispensed with by eliminating the curved surfaces 28 from the fixed cutting die 16, in which case the prongs of the finished stiffener will appear as shown in Fig. 11, the prongs sloping inwardly, each at an acute angle to the body of the stiffener, but having no curvature at their tips.

In applying stiffeners, such as those shown in either Figs. 10 or 11, to the insole of a shoe, when the ends of the stiffener are struck by a hammer the prongs will be driven through the leather of the insole and upon engaging the metal bottom of the last upon which the shoe is mounted the prongs will be caused to turn inwardly as they clench against the inner side of the insole. If, in addition to sloping at an acute angle to the body of the insole, the prongs are provided with curved tips, as shown in Figs. 9 and 10, they will have even greater tendency to turn inwardly when struck by a hammer and thus effective clenching of the prongs will be still further facilitated. On account of the fact that the prongs of each pair have their body portions disposed in the same plane they will bend substantially in the same direction and manner when being clenched in the material of a sole to which the stiffener is applied.

Having described my invention, what I claim as new and desire to secure by Letters Patent of the United States is:

1. That improvement in methods of making shank stiffeners which consists in forming from sheet material an elongated blank having a flat body portion and a prong with a curved tip, the prong projecting lengthwise beyond one extremity of the body portion of the blank, and bending the prong into a position inclined toward the opposite end of the blank.

2. That improvement in methods of making shank stiffeners which consists in forming from sheet material an elongated blank having a flat body portion and a prong, curving the ends of the prongs as they are being formed, and thereafter bending each prong into a position to form an acute angle with the body portion of the blank.

3. That improvement in methods of making shank stiffeners which consists in forming from sheet material a blank having a flat body portion and a pair of prongs extending lengthwise of the blank and projecting beyond the extremities of the body portion thereof, curving the ends of the prongs as they are being formed, and thereafter bending each prong into a position to form an acute angle with the body portion of the blank.

4. That improvement in methods of making shank stiffeners which consists in forming a blank of such shape as to provide a prong extending lengthwise of the blank beyond one end of the body portion thereof and having its tip curved out of the plane of the blank, and bending the prong in the direction toward which its tip is curved into a position to form an acute angle with the body portion of the blank.

5. That improvement in methods of making shank stiffeners which consists in forming at one end of a stiffener blank a prong extending lengthwise of the blank and projecting beyond one end of the body portion thereof and simultaneously imparting a lengthwise curvature to the prong, and bending the prong in a direction away from its salient side into a position disposed at a substantial angle to the body of the stiffener blank.

6. That improvement in methods of making shank stiffeners which consist in forming at one end of a stiffener blank a prong extending lengthwise of the blank and projecting beyond one end of the body portion thereof, and bending the prong into a position to form an acute angle with the body of the stiffener blank while imparting lengthwise curvature to the body of the blank.

7. That improvement in methods of making shank stiffeners which consists in forming at opposite ends of a stiffener blank a prong having its tip curved toward one side of the prong, and bending said prongs in the directions toward which their tips are curved into positions to form acute angles with the adjacent body portions of the stiffener blank.

8. That improvement in methods of making shank stiffeners which consists in forming an attaching prong at one end of a stiffener blank, curving the tip of the prong, and bending the prong through an arc of more than ninety degrees into a plane disposed at an acute angle to the adjacent end portion of the stiffener.

9. That improvement in methods of making shank stiffeners which consists in forming a prong extending lengthwise of a shank stiffener blank, imparting an initial curvature to said prong, and thereafter bending the prong substantially where the prong joins the body portion of the blank.

10. That improvement in methods of making shank stiffeners which consists in forming a prong extending lengthwise of a shank stiffener blank, imparting an initial curvature to said prong, and thereafter bending the prong into a position forming an acute angle with the body portion of the blank.

11. The improvement in methods of making shank stiffeners which consists in feeding a strip of stock into position to be acted upon by co-operating dies and operating said dies to form prongs extending beyond the bends of the blank, transferring the blank into position to be acted upon by co-operative molding dies and operating said dies to mold the blank into the form of a shank stiffener, bending the prongs out of the plane of the body portion of the stiffener, moving the dies out of co-operative relation, and thereafter further bending the prongs to position them at acute angles to the body of the stiffener.

12. That improvement in methods of making shank stiffeners which consists in forming prongs extending beyond the ends of a stiffener blank, positioning the pronged blank between co-operative molding dies and operating said dies to mold the blank into the form of a shank stiffener, moving wiper members transversely of the stiffener in one direction to bend the prongs toward the ends of one of the dies, moving the wiper members in another direction to strip the stiffener from said die, and moving the wiper members toward each other to set the prongs at acute angles to the body portion of the stiffener.

13. A shank stiffener consisting of a longitudinally arched strip having two attaching prongs projecting from one extreme end of the strip and having their body portions disposed in the same plane, said prongs forming an acute angle with the adjacent portion of the strip and sloping toward the opposite end of the strip and having their tips offset from the plane of their body portions.

14. A shank stiffener consisting of an elongated strip having an attaching prong projecting from one extreme end thereof, the prong sloping inwardly toward the opposite end of the strip and having its tip curved out of the plane of the rest of the prong.

15. A shank stiffener consisting of a longitudinally arched strip having a pair of attaching prongs struck up at each end of the strip, each prong sloping inwardly toward the opposite end of the strip and having an inwardly curved tip.

In testimony whereof I have signed my name to this specification.

BRADFORD B. WATERMAN.